United States Patent
Nahata

(10) Patent No.: US 7,231,069 B2
(45) Date of Patent: Jun. 12, 2007

(54) MULTIPLE VIEW ANGLES CAMERA, AUTOMATIC PHOTOGRAPHING APPARATUS, AND IRIS RECOGNITION METHOD

(75) Inventor: Kenji Nahata, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 923 days.

(21) Appl. No.: 09/820,996

(22) Filed: Mar. 30, 2001

(65) Prior Publication Data

US 2001/0028730 A1 Oct. 11, 2001

(30) Foreign Application Priority Data

Mar. 31, 2000 (JP) .............................. 2000-095998

(51) Int. Cl.
*G06K 9/00* (2006.01)
(52) U.S. Cl. .................................... 382/117
(58) Field of Classification Search ........ 382/115–119; 396/72, 76, 87, 272, 326, 353, 427; 348/49, 348/208.3, 208.16, 211.9, 14.08, 588; 357/200, 357/206, 208; 340/5.53, 5.83
See application file for complete search history.

(56) References Cited

U.S. PATENT DOCUMENTS

| | | | | |
|---|---|---|---|---|
| 4,855,782 A | * | 8/1989 | Kobayashi et al. | ............ 396/88 |
| 5,005,083 A | * | 4/1991 | Grage et al. | ................ 348/588 |
| 5,430,511 A | * | 7/1995 | Paff et al. | ................... 396/427 |
| 5,901,238 A | * | 5/1999 | Matsushita | .................. 382/117 |
| 6,476,862 B1 | * | 11/2002 | Tatsumi et al. | .......... 348/14.08 |
| 6,687,389 B2 | * | 2/2004 | McCartney et al. | ........ 382/118 |

* cited by examiner

*Primary Examiner*—Vikkram Bali
(74) *Attorney, Agent, or Firm*—Venable LLP; Michael A. Sartori; Catherine M. Voorhees

(57) ABSTRACT

A multiple view angles camera used for an automatic photographing apparatus includes a narrow view angle lens, a cylinder lens, and an image sensor. One image sensor is used, and a wide view angle image and a narrow view angle image are projected on the image sensor at the same time. The narrow view angle lens projects the image of the eye photograph range on an eye image region on the image sensor. The cylinder lens is a wide view angle lens and projects the image of a wide view angle photograph range on a wide view angle image region on the image sensor by way of this cylinder lens and the narrow view angle lens.

5 Claims, 17 Drawing Sheets

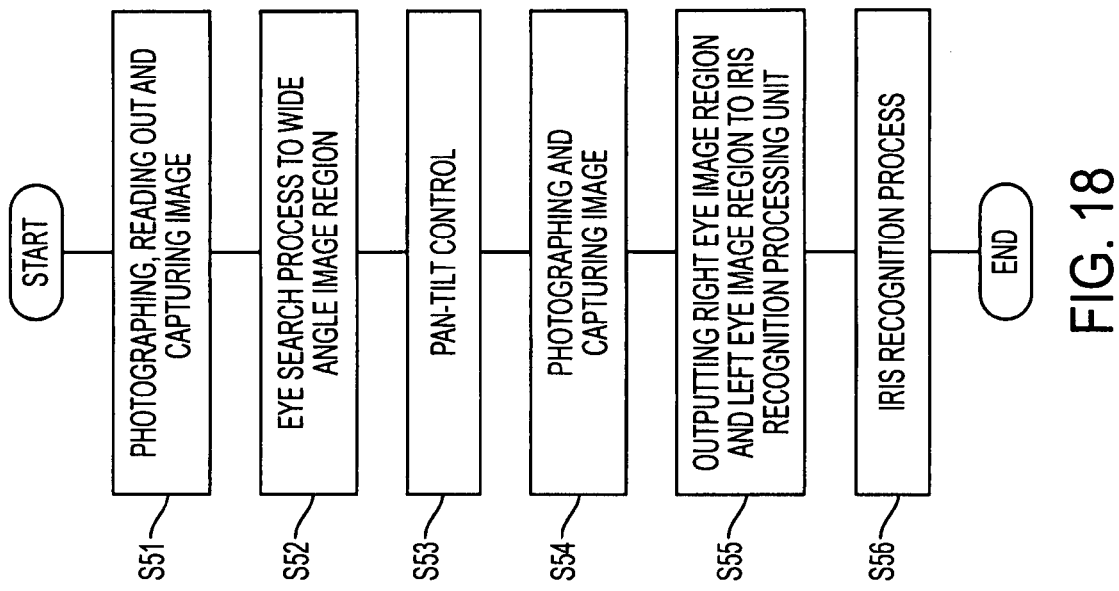
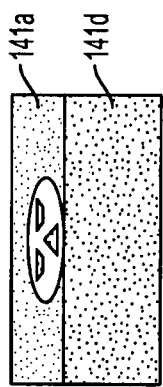
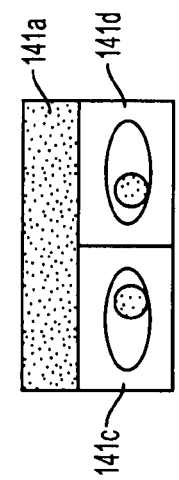

MULTIPLE VIEW ANGLES CAMERA, AUTOMATIC PHOTOGRAPHING APPARATUS, AND IRIS RECOGNITION METHOD

BACKGROUND OF THE INVENTION

1. Field of the Invention

The present invention relates to a multiple view angles camera for taking wide view angle photographs and a narrow view angle photographs of a specific subject, an automatic photographing apparatus for photographing using this multiple view angles camera, and an iris recognition method for performing iris recognition using this automatic photographing apparatus.

2. Description of the Related Art

As an iris recognition apparatus, an iris recognition apparatus using the automatic photographing apparatus has been known. The automatic photographing apparatus used for the iris recognition apparatus photographs, first of all, the facial image of a subject standing in front of the apparatus by way of a wide view angle camera. Next, the subject's eye position is automatically detected from this facial image. Then, based on the eye position thus detected, a pan-tilt mechanism aim the narrow view angle camera which is mounted on the mechanism at the eye. Then, the eye image of the subject is photographed by way of the narrow view angle camera, and then it is output to the iris recognition unit.

The iris recognition unit generates iris codes by processing the subject's eye images which is output from the automatic photographing apparatus. By comparing the iris code thus generated with the iris code which is registered in advance, it is determined whether or not the subject is the person himself, and if it is recognized that the subject is the person himself, a predetermined process, such as opening an electric lock, is performed.

For the iris recognition apparatus using the automatic photographing apparatus, it is not required for the subject himself to adjust his eye position to the field of view of the camera. Therefore, its noninvasiveness is the distinctive feature.

However, conventionally, two cameras of a narrow view angle camera for eye photographing and a wide view angle camera for face photographing for eye position detection as the automatic photographing apparatus have been required. Therefore, there has been a problem in which the size of the camera unit which include two cameras has been large and the weight thereof has been heavy. Further, since the image signals have been output from each camera, a circuit for processing the image signals therefor has come to be complex. As a result, there has been a problem in which the cost of the automatic photographing apparatus, in particular the iris recognition apparatus, has come to increase.

SUMMARY OF THE INVENTION

Therefore, it is the object of the present invention to provide a multiple view angles camera, an automatic photographing apparatus, and an iris recognition method which overcome the above issues in the related art in order to reduce the size and weight of the camera unit, and the cost of the automatic photographing apparatus, in particular the iris recognition apparatus. This object is achieved by combinations described in the independent claims. The dependent claims define further advantageous and exemplary combinations of the present invention.

To achieve the above-mentioned object, the automatic photographing apparatus of the present invention is a multiple view angles camera characterized in that the camera thereof includes a single image sensor for outputting images projected by lenses as an image signal; a narrow view angle lens for projecting an image of a narrow view angle photograph range on a narrow view angle image region on the image sensor; and a wide view angle lens for projecting an image of a wide view angle photograph range on a wide view angle image region on the image sensor. A single image sensor for outputting the images projected by the lenses as an image signal and the above-mentioned wide view angle lens may be provided in front of the above-mentioned narrow view angle lens and be a cylinder lens for projecting an image of the wide view angle photograph range on the wide view angle image region on the image sensor by way of the lens and the above-mentioned narrow view angle lens.

Further, an automatic photographing apparatus may include a multiple view angles camera for projecting an image of a wide view angle photograph range and an image of a narrow view angle photograph range on a wide view angle image region and a narrow view angle image region on one image sensor at the same time, and for outputting the images as an image signal; a pan-tilt mechanism unit for changing a photographing direction of the multiple view angles camera; and a photograph direction control unit for defining the photographing direction to photograph a specific portion of a specific subject with the narrow view angle photograph range based on the image of the specific subject in the wide view angle photograph range of the multiple view angles camera, and for controlling the pan-tilt mechanism unit based on the photographing direction.

Further, an automatic photographing apparatus may include a multiple view angles camera for projecting an image of a wide view angle photograph range and images of more than one narrow view angle photograph ranges on a wide view angle image region and more than one narrow view angle image regions on one image sensor at the same time, and for outputting the images as an image signal; a pan-tilt mechanism unit for changing a photographing direction of the multiple view angles camera; and a photograph direction control unit for defining the photographing direction to photograph more than one specific portions of a specific subject with the more than one narrow view angle photograph ranges based on the image of the specific subject in the wide view angle photograph range of the multiple view angles camera, and for controlling the pan-tilt mechanism unit based on the photographing directions.

In accordance with the present invention structured in the foregoing, since the multiple view angles camera which projects the wide view angle image and the narrow view angle images on one image sensor, is included, only one camera is required for its operation although two cameras have been required conventionally, and further it is made possible to reduce the size and cost.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

The present invention will be understood more fully from the detailed description given below, in conjunction with the accompanying drawings.

FIGS. 17A and 17B illustrate patterns read out from an image sensor of the fifth embodiment.

FIG. 18 is a flowchart of operating the fifth embodiment of the automatic photographing apparatus of the present invention.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Preferred embodiments of the present invention are explained hereinafter with reference to drawings. The same reference number is used for the same element of respective drawings.

The first embodiment is explained.

Figure 1A:
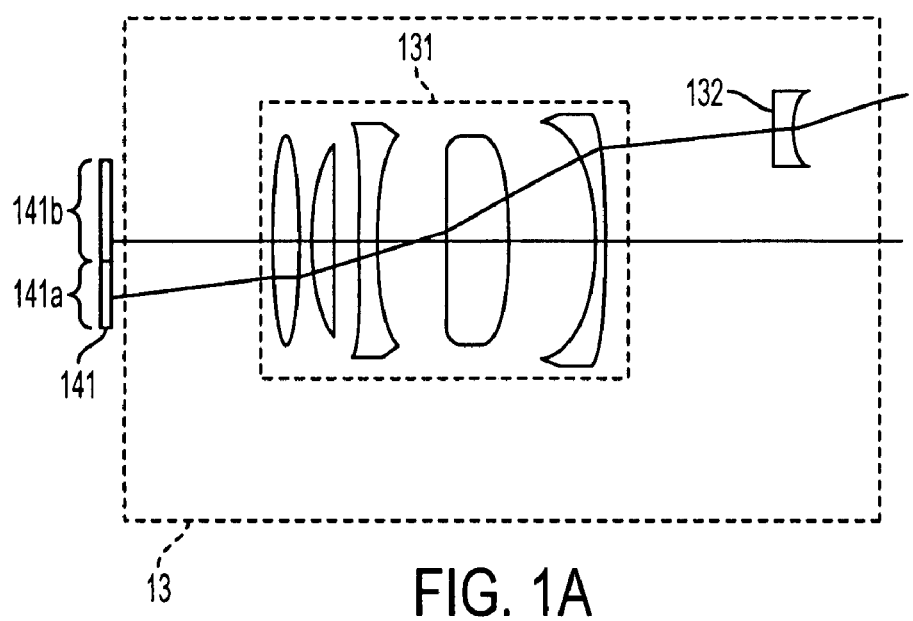
FIGS. 1A to 1C illustrate a multiple view angles camera of the present invention.
Figure 1B:
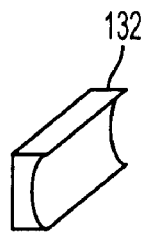
Figure 1C:
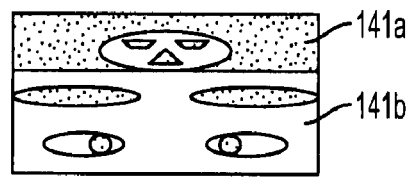

FIGS. 1A to 1C illustrate a multiple view angles camera. Prior to the explanation thereto, an automatic camera system using the multiple view angles camera is explained.

Figure 2:
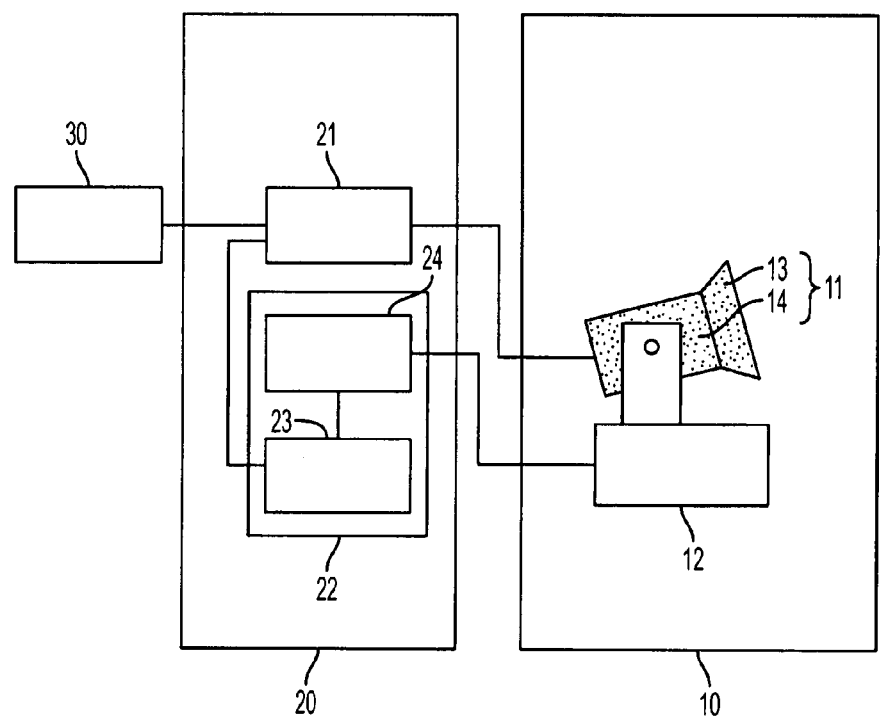
FIG. 2 is a block diagram of the first embodiment of the automatic photographing apparatus of the present invention.

FIG. 2 is a block diagram of the first embodiment of the automatic camera system of the present invention.

The system of FIG. 2 shows the structure which is applied to an iris recognition system which performs iris recognition using the automatic camera system.

The system of FIG. 2 includes a camera 10, a control unit 20, and an iris recognition processing unit 30.

The camera 10 includes a multiple view angles camera 11 and a pan-tilt mechanism 12. The multiple view angles camera 11 is a high definition camera and includes a multiple view angles lens 13 and a camera body 14. The multiple view angles lens 13 is a lens having a function for projecting a wide view angle photograph region and a narrow view angle photograph region as a wide view angle image region and a narrow view angle image region on one image sensor, and this lens is explained in detail hereinafter. Further, the camera body 14 includes the image sensor and so forth, photographs, by way of the multiple view angles lens 13, a wide view angle image including the whole face of a subject as a target and a narrow view angle image between both eyes located in a specific position, and has a function for sending them to an image capture unit 21, which is described hereinafter, in a control unit 20.

The pan-tilt mechanism 12 functions for driving the multiple view angles camera 11 i.e. changing its direction in the right and left directions and in the up and down directions. In addition, the pan-tilt mechanism 12 is so structured as to control by a photograph direction control unit 22, which is described hereinafter, of the control unit 20.

The control unit 20 includes the image capture unit 21 and the photograph direction control unit 22. The photograph direction control unit 22 includes an eye search processing unit 23 and a pan-tilt control unit 24. The image capture unit 21 has a function for inputting an image signal from the multiple view angles camera 11, and outputs therefrom is supplied to the eye search processing unit 23 and an iris recognition processing unit 30.

The photograph direction control unit 22 is a control unit for defining a photographing direction to photograph the eye image with narrow view angle photograph range based on a face image of the subject in the wide view angle photograph region of the multiple view angles lens 13, and for controlling the pan-tilt mechanism 12 based on the photographing direction thereof. The eye search processing unit 23 has a function for searching for the eye position of the subject from an image of the wide view angle photograph region which includes the whole face of the subject among the images captured by the image capture unit 21, and for sending a control signal to the pan-tilt control unit 24 in order for the eyes of the subject to be photographed within the eye photograph region of the multiple view angles camera 11. The pan-tilt control unit 24 has a function for outputting a driving signal to the pan-tilt mechanism 12 in order for the multiple view angles camera 11 to be positioned in the appropriate position based on the control signal sent from the eye search processing unit 23.

The iris recognition processing unit 30 is a functional unit of performing the iris recognition process based on the signal of the eye image of the subject captured by the image capture unit 21.

Next, the multiple view angles lens 13 is explained herein in detail.

The conventional lenses project a continuous photograph region with a magnification on the image sensor by way of a set of lenses. Therefore, in order to photograph more than one photograph regions, as explained in the prior art, it is required to employ more than one sets of lenses and cameras. On the contrary, the multiple view angles lens 13 project more than one photograph regions with each different magnification on the image sensor by way of a set of lenses.

FIGS. 1A to 1C illustrate the multiple view angles camera as indicated in the foregoing, and also indicate the multiple view angles lens 13 for the most part. FIG. 1A illustrates lens arrangements. FIG. 1B is a perspective view of a cylinder lens. FIG. 1C illustrates images projected on an image sensor 141. Here, an illustration such as a signal processing circuit of image signals output from the image sensor 141 is omitted.

As shown in FIG. 1A, the multiple view angles lens 13 is composed of a narrow view angle lens 131 and a cylinder lens 132 which is a wide view angle lens. The narrow view angle lens 131 is composed of more than one lenses. The narrow view angle lens 131 is so structured as to project the eye image of the subject on an upper region (an eye image region (a narrow view angle image region) 141*b*) of one image sensor 141. Further, the cylinder lens 132 is a lens which is located in front of the narrow view angle lens 131. The cylinder lens 132, as shown in FIG. 1B, is a lens having a cylindrical surface as illustrated in FIG. 1C.

By locating such a cylinder lens 132 in front of the narrow view angle lens 131 at appropriate intervals, as shown in FIG. 1A, the eye image which is the image for the narrow view angle photograph range is projected on the upper region (the eye image region 141*b*) of the image sensor 141, and the face image as the image for the wide view angle photograph region is projected on the lower region (a wide view angle image region 141*a*) of the image sensor 141. Further, since the image captured in the mode of FIG. 1A is the upside-down image, it is drawn by turning it back in the normal erecting condition.

Figure 3A:
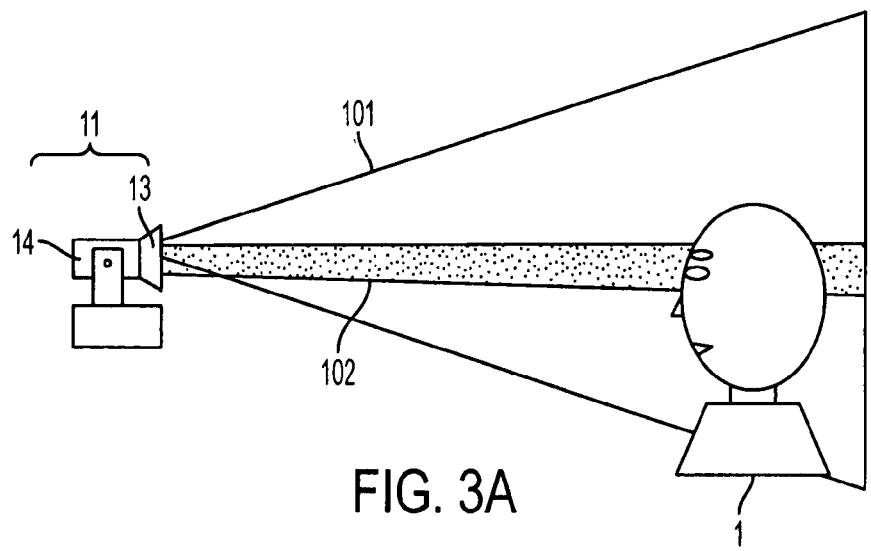
FIGS. 3A to 3C illustrate photograph ranges of the multiple view angles camera.
Figure 3B:
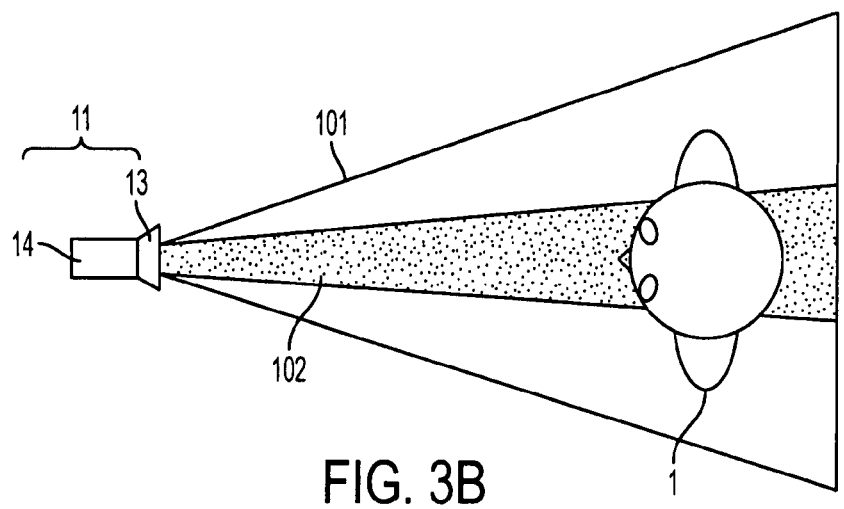
Figure 3C:
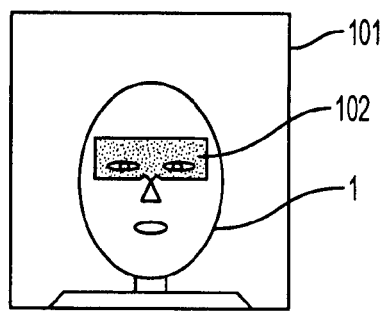

FIGS. 3A to 3C illustrate the range of the photograph of the multiple view angles camera 11.

FIG. 3A illustrates photograph ranges seen from the lateral direction. FIG. 3B illustrates photograph ranges seen from the upper direction. FIG. 3C illustrates the subject seen from the camera unit.

As indicated in the drawings, the multiple view angles camera 11 has one wide view angle photograph range 101 and one narrow view angle photograph range (an eye photograph range 102). The wide view angle photograph range 101 is used for photographing a wide range containing the whole face of a subject 1. Further, the region which is projected on the image sensor 141 by the wide view angle photograph range 101 is defined as the wide view angle image region 141*a* (referring to FIG. 1C). The narrow view angle photograph range is used for photographing both eyes of the subject 1 at the same time, and defined as the eye photograph range 102. Further, the region which is projected by the eye photograph range 102 on the image sensor 141 is defined as the eye image region 141*b* (referring to FIG. 1C.).

As shown in FIG. 1C, since the eye image region 141*b* which is used for the iris recognition process is formed in a (long and narrow) rectangular shape containing both eyes, a residual portion, which is not required for iris recognition, is accrued in the vertical direction of the image sensor 141 of the camera. Thus, such a residual region is used as the wide view angle image region 141*a*. Therefore, it is not a result for the photograph size of the iris of an eye image region 101*a* to be reduced because the wide view angle image region 141*a* is provided on the same image sensor 141, and in addition it is not caused to affect the precision of iris recognition.

Figure 4:
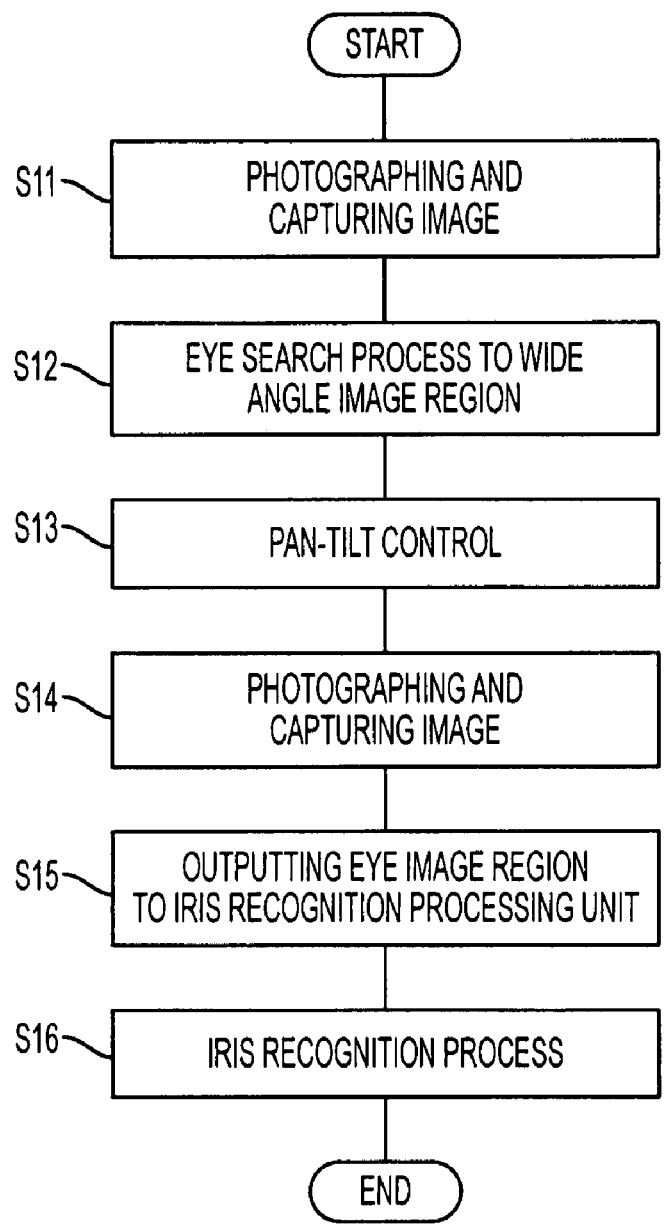
FIG. 4 is a flowchart of operating the first embodiment of the automatic photographing apparatus of the present invention.

Next, the iris recognition process which uses an automatic photographing apparatus of the embodiment is explained herein. FIG. 4 is a flowchart of the iris recognition process.

First of all, the subject 1 is photographed by the multiple view angles camera 11, and the image thereof is captured by the image capture unit 21 (step S11).

Next, the eye search process is performed to the wide view angle image region 141*a* in the captured image by the eye search processing unit 23 (step S12).

Based on the result of the eye search process, the pan-tilt mechanism 12 is controlled by the pan-tilt control unit 24, and the multiple view angles camera 11 is directed at a suitable angle to the eye image region 141*b* is capable of photographing both eyes of the subject(step S13).

Once more, the subject 1 is photographed by the multiple view angles camera 11, and the image thereof is captured by the image capture unit 21 (step S14).

The image of the eye image region 141*b* in the captured image is output to the iris recognition processing unit 30 (step S15)

In the iris recognition processing unit 30, the iris recognition process is performed and it is identified whether or not the subject is the person himself (step S16). If it is recognized that the subject is the person himself, a predetermined process, such as opening an electric lock, is performed.

Here, the iris recognition process at the step S16 defines the iris region from the eye image data received from the image capture unit 21, and then the image of the iris region thus defined is coded. Then, although it is determined whether or not the subject is the person himself by comparing it with a dictionary of an iris code which is registered in advance, the detail explanation therefor is omitted because the process thereof is known to the public.

Further, in the first embodiment, the multiple view angles camera 11 is so structured as shown in FIGS. 1A to 1C, but it is possible to employ the structure other than that.

Figure 5A:
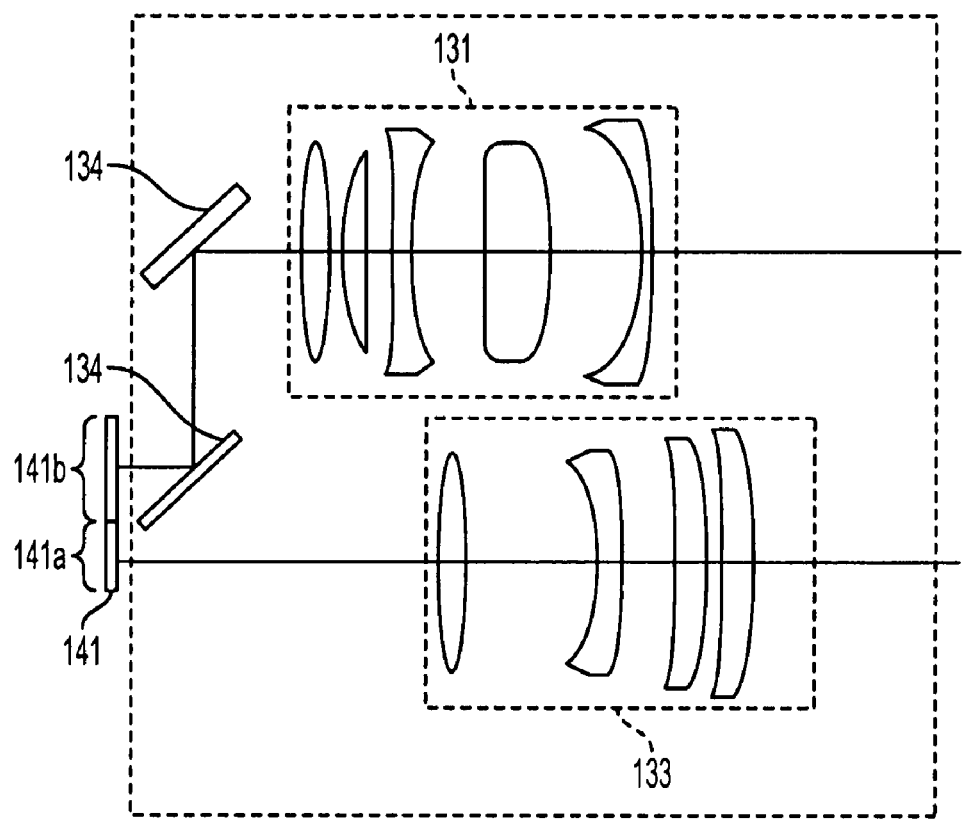
FIGS. 5A and 5B illustrate another embodiment of the multiple view angles camera.
Figure 5B:
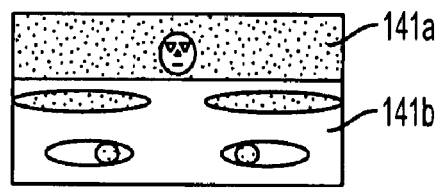

FIGS. 5A and 5B illustrate another embodiment of the multiple view angles camera 11.

FIG. 5A is a sectional view of the multiple view angles camera 11 seen from the lateral direction. FIG. 5B illustrates the image on the image sensor 141.

This embodiment shows that a wide view angle lens 133 is provided. The wide view angle lens 133 and the narrow view angle lens 131 are so arranged as for respective optical axes to be paralleled with each other, and also for the image of the subject to be projected on one image sensor 141 by way of mirrors 134 (or prisms). Namely, they are structured in such a way that the image of the wide view angle lens 133 is projected on the lower region (in the case of being illustrated in FIG. 5A) of the image sensor 141 and the image of the narrow view angle lens 131 is further reflected by two mirrors 134 and then projected on the upper region of the image sensor 141.

With this structure, the projected image on the image sensor 141 is sort of a image illustrated in FIG. 5B as an example. Here, the explanation for the following operation being successive after the image sensor 141 is omitted because of the same operation as the first embodiment.

Thus, according to the first embodiment, since the multiple view angles camera 11, which projects the wide view angle image and the narrow view angle image on one image sensor 141, is included, only one camera is required for its operation although two cameras have conventionally been required, and further it is made possible to reduce the size and cost. Further, since the automatic photographing apparatus is structured using the multiple view angles camera 11, it is enough to process only the image from one image sensor 141, and thus the process time can be reduced. Further, since a process circuit can be simplified, it is possible to reduce the cost thereof. Still further, since the iris recognition is performed using such an automatic photographing apparatus, it is possible to increase the speed of the iris recognition process without damaging the precision of the iris recognition.

Next, the second embodiment is explained.

The second embodiment is a multiple view angles camera, which photographs an image of a wide view angle photograph range and an image of such a narrow view angle photograph range.

Figure 6:
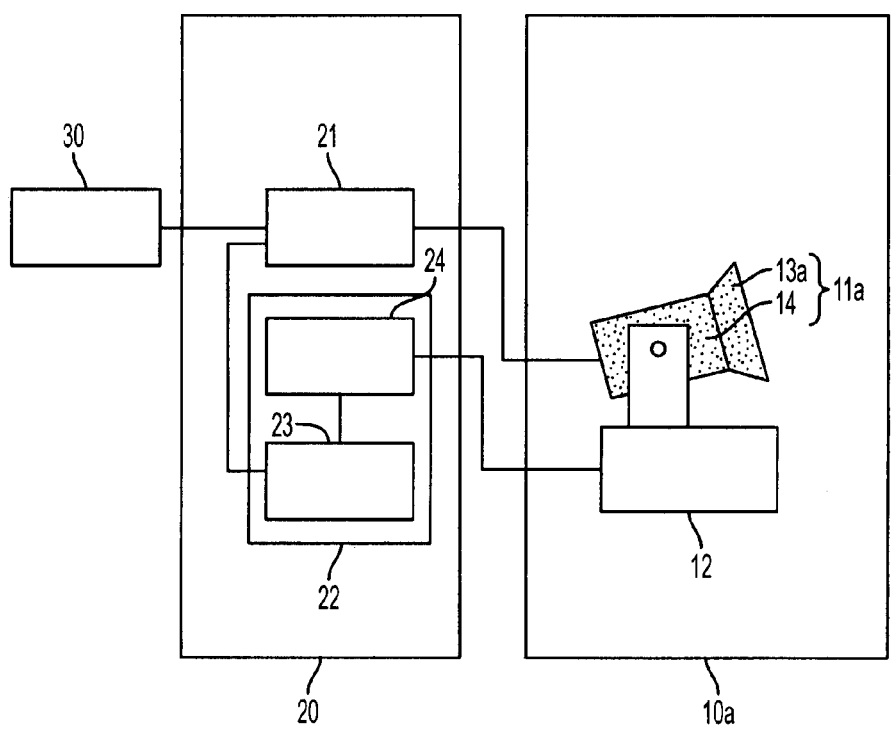
FIG. 6 is a block diagram of the second embodiment of the automatic photographing apparatus of the present invention.

FIG. 6 is a block diagram of the second embodiment.

The system of FIG. 6 includes a camera unit 10*a*, the control unit 20, and the iris recognition processing unit 30. Here, since the structure of the control unit 20 and the iris recognition processing unit 30 is the same as the first embodiment, the same reference number is used to the corresponding part and thus the explanation therefor is omitted.

The camera unit 10*a* includes a multiple view angles camera (a face and eye image camera) 11*a* and the pan-tilt mechanism 12, and the pan-tilt mechanism 12 is the same as the first embodiment. For the multiple view angles camera 11*a*, the different point from the multiple view angles camera 11 of the first preferred embodiment is the structure of a multiple view angles lens 13*a*.

Figure 7A:
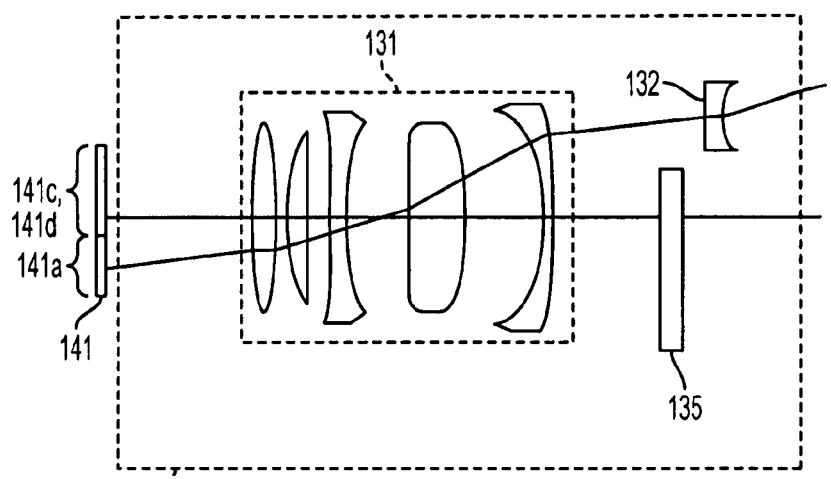
FIGS. 7A to 7C illustrate the multiple view angles camera of the second embodiment.
Figure 7B:
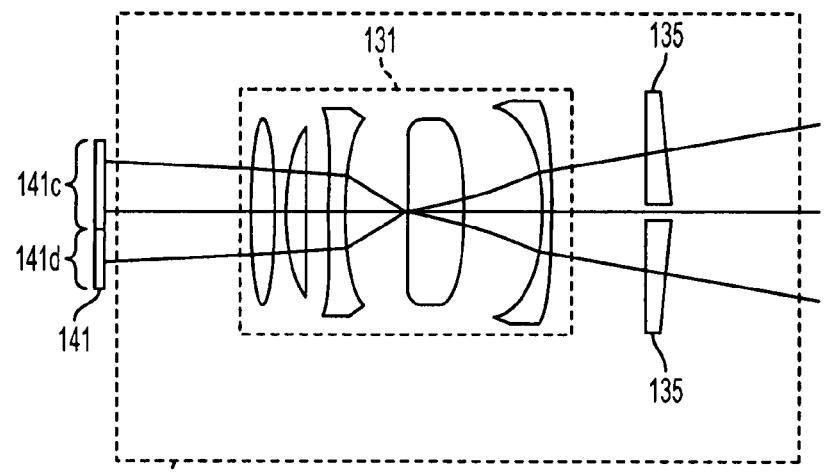
Figure 7C:
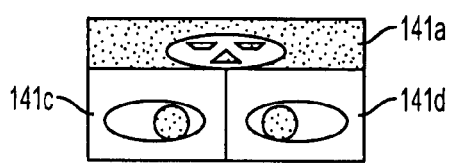

FIGS. 7A to 7C illustrate the multiple view angles camera 11*a* of the second embodiment.

FIG. 7A is a sectional view of lenses seen from the lateral direction. FIG. 7B is a sectional view of the lower half part of the lenses seen from the upper direction. FIG. 7C illustrates an image projected on the image sensor 141.

As shown in FIGS. 7A and 7B, the multiple view angles lens 13*a* includes a narrow view angle lens 131, the cylinder lens 132, and a pair of prisms 135. The two prisms 135 are provided in a position superior to the narrow view angle lens 131 symmetrically in the right and left directions from the central axis. The narrow view angle lens 131 and the cylinder lens 132 have the same structure as the first preferred embodiment.

By arranging such a pair of prisms 135 in a position superior to the narrow view angle lens 131 at a predetermined interval, as shown in FIGS. 7A and 7B, a left eye image and a right eye image as the images of right and left narrow view angle photograph ranges are projected on the upper region (a right eye image region 141*c* and a left eye image region 141*d*) of the image sensor 141 by way of the right and left prisms 135. Here, the condition in which the face image as the image of the wide view angle photograph range is projected on the lower region (the wide view angle image region 141*a*) is the same as the first embodiment.

Figure 8A:
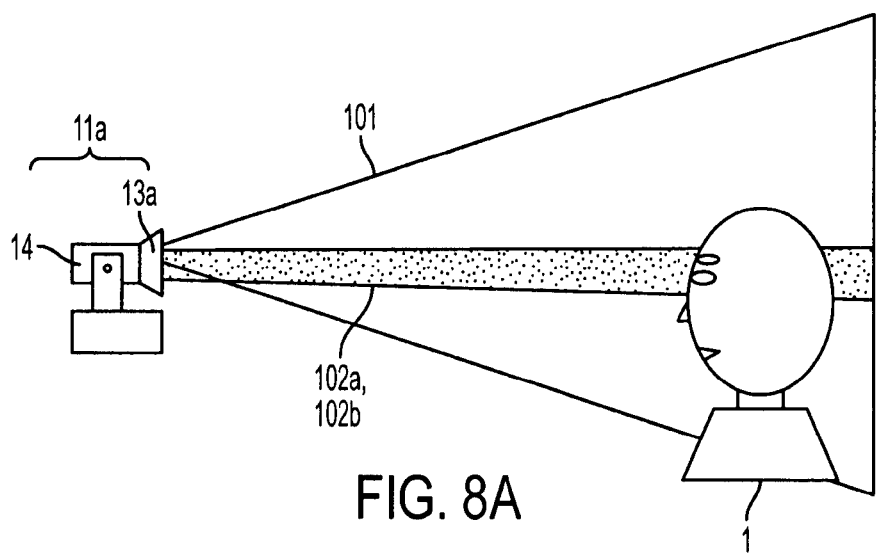
FIGS. 8A to 8C illustrate a photograph range of the multiple view angles camera of the second embodiment.
Figure 8B:
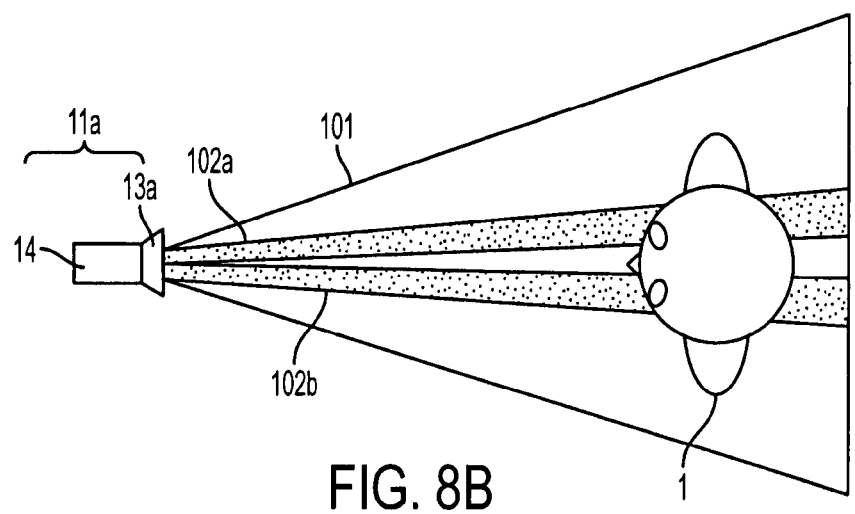
Figure 8C:
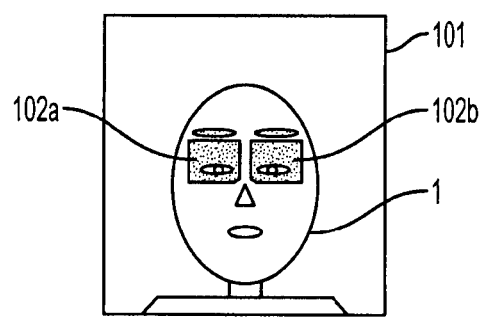

FIGS. 8A to 8C illustrate the range of the photograph of the multiple view angles camera 11*a*.

FIG. 8A is a side view of the multiple view angles camera seen from the lateral direction. FIG. 8B is a top plane view of the multiple view angles camera seen from the upper direction. FIG. 8C illustrates the subject seen from the camera unit.

As shown in FIGS. 8A to 8C, the multiple view angles camera 11*a* includes one wide view angle photograph range 101 and two narrow view angle photograph range (right eye photograph range 102*a* and left eye photograph range 102*b*). The wide view angle photograph range 101 is used for photographing a wide range containing the whole face of the subject 1. Further, the region where the wide view angle photograph range 101 is projected on the image sensor 141 is defined as the wide view angle image region 141*a* (referring to FIG. 7C). The narrow view angle photograph range is used for photographing respective right and left eyes of the subject 1 at the same time, and it is divided into the right eye photograph range 102*a* and the left eye photograph range 102*b*. Further, the regions in which the right eye photograph range 102*a* and the left eye photograph range 102*b* are projected on the image sensor 141 are defined as the right eye image region 141*c* and the left eye image region 141*d* (referring to FIG. 7C).

Next, the iris recognition process using the automatic photographing apparatus of the present embodiment is explained.

Figure 9:
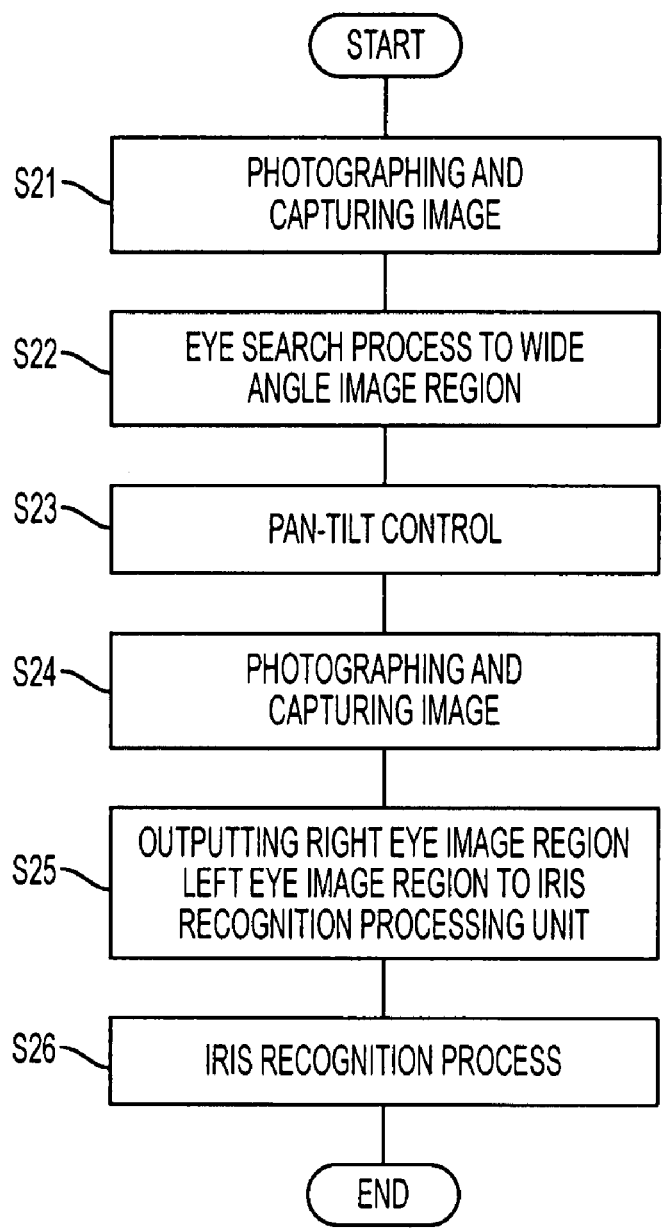
FIG. 9 is a flowchart of operating the second embodiment of the automatic photographing apparatus of the present invention.

FIG. 9 is a flowchart of the iris recognition process.

First of all, the subject 1 is photographed by the multiple view angles camera 11*a*, and the image thereof is captured by the image capture unit 21 (step S21).

Next, among the captured images, the eye search process is performed to the wide view angle image region 141*a* by the eye search processing unit 23 (step S22).

Based on the result of the eye search process, the pan-tilt mechanism 12 is controlled by the pan-tilt control unit 24, and the multiple view angles camera 11*a* is declined at a suitable angle until the right eye image region 141*c* and the left eye image region 141*d* are capable of photographing both eyes of the subject (step S23).

Once more, the subject 1 is photographed by the multiple view angles camera 11*a*, and the image thereof is captured by the image capture unit 21 (step S24).

Among captured images, the image of the right eye image region 141*c* and the left eye image region 141*d* is output to the iris recognition processing unit 30 (step S25).

In the iris recognition processing unit 30, the iris recognition process is performed and it is identified whether or not the subject is the person himself (step S26). If it is recognized that the subject is the person himself, a process for outputting the predetermined result, such as opening an electric key, is performed.

In this way, according to the second embodiment, since the multiple view angles camera 11*a*, which projects the wide view angle image and the narrow view angle image on one image sensor 141, is included, only one camera is required for its operation although two cameras have been required conventionally, and further, it is made possible to lessen the size thereof and the cost therefor. Further, since the automatic photographing apparatus is structured using the multiple view angles camera 11*a*, it is enough to process only the image from one image sensor 141, and thus the process time can be reduced and further it is made possible to lessen the cost therefor because the processing circuit can be simplified. Further, since it is so structured as for a plurality of regions to be projected as the narrow view angle image, it is possible to project the required region, such as right and left eye images, by magnifying them. Still further, since the iris recognition is performed using such an automatic photographing apparatus, it is possible to increase the speed of the iris recognition process without damaging the precision of the iris recognition, and further it is possible to improve the precision of the iris recognition process since it is possible to photograph right and left eye images by magnifying them.

Next, the third embodiment is explained herein.

In the third embodiment, the embodiment is structured in such a way that two narrow view angle photograph ranges are photographed by the multiple view angles camera and the two regions thereof are changeable.

Figure 10:
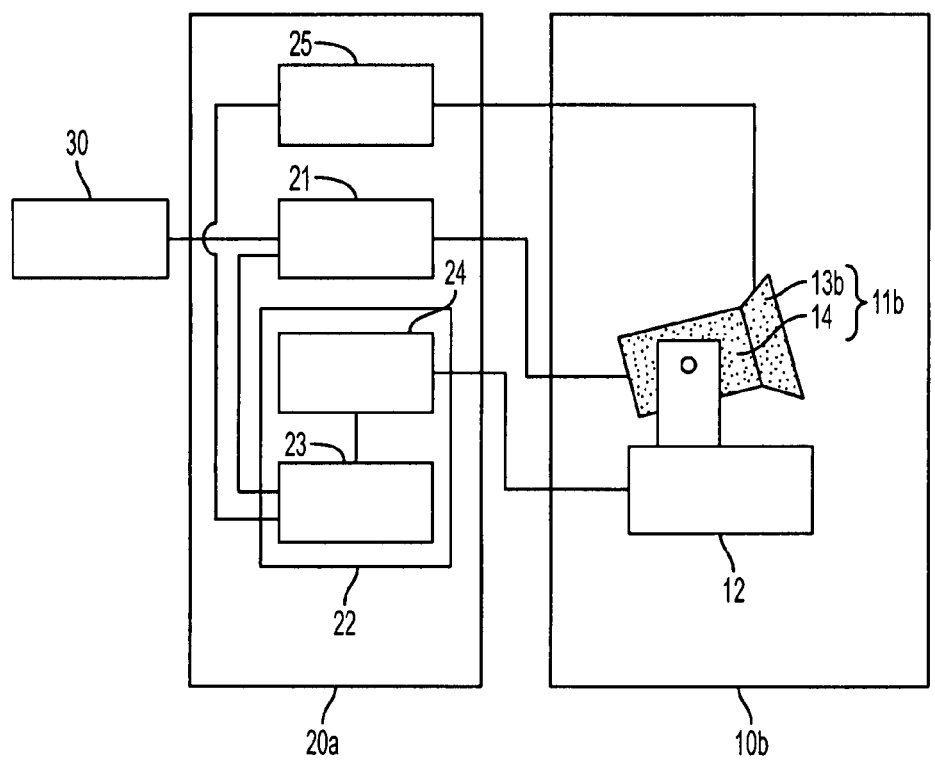
FIG. 10 is a block diagram of the third embodiment of the automatic photographing apparatus of the present invention.

FIG. 10 is a block diagram of the third embodiment.

The system of FIG. 10 includes a camera unit 10b, a control unit 20a, and the iris recognition processing unit 30. Here, since the structure of the iris recognition processing unit 30 is the same as the first and second embodiments, the explanation therefor is omitted.

The camera unit 10b includes a multiple view angles camera (a face and eye image camera) 11b and a pan-tilt mechanism 12, and the pan-tilt mechanism 12 is the same as the first and second embodiments. On the other hand, the point in which the multiple view angles camera 11b differs from the multiple view angles camera 11a of the second embodiment is in that the reflecting angle of the prisms 135 (referring to FIGS. 7A to 7C) is changeable in the multiple view angles lens 13b.

Namely, the multiple view angles lens 13b is formed in such a way that respective reflecting angles of a pair of the prisms 135 are changeable. As a method for making it possible, the structures, in which the angles of an incidence face and an outgoing face are so made as to be changeable and thus the sectional shape thereof is changed, and so forth are used.

By using such a multiple view angles lens 13b, a left eye image and a right eye image as the images of right and left narrow view angle photograph ranges are projected respectively on the upper region (a right eye image region 141c and a left eye image region 141d) of the image sensor 141, and the face image as the image of the wide photograph range is projected on the lower region (the wide view angle image region 141a) of the image sensor 141.

Figure 11A:
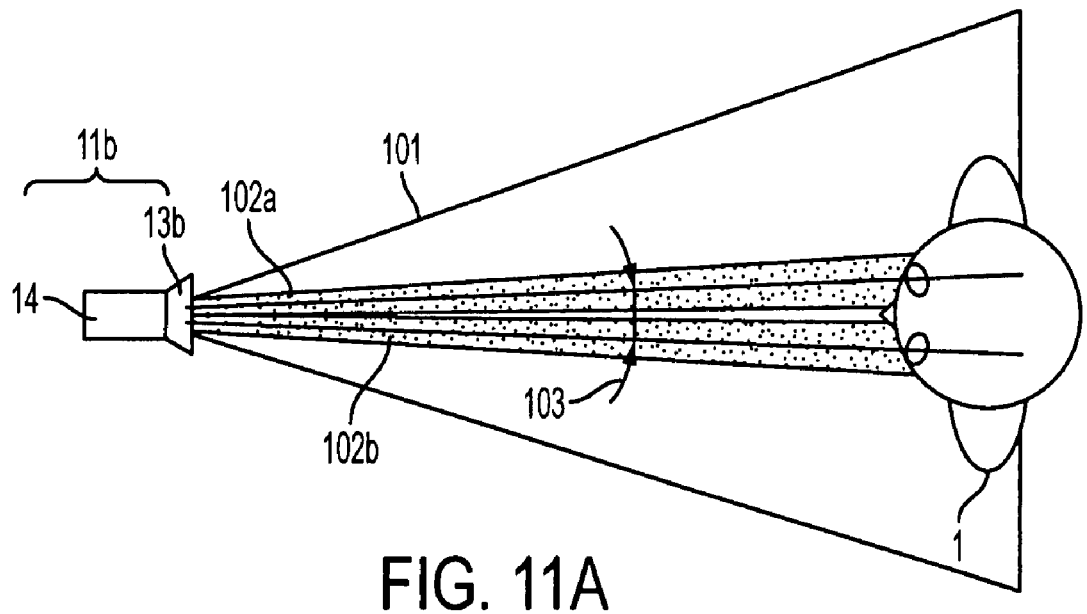
FIGS. 11A and 11B illustrate a photograph range of the multiple view angles camera of the third embodiment.
Figure 11B:
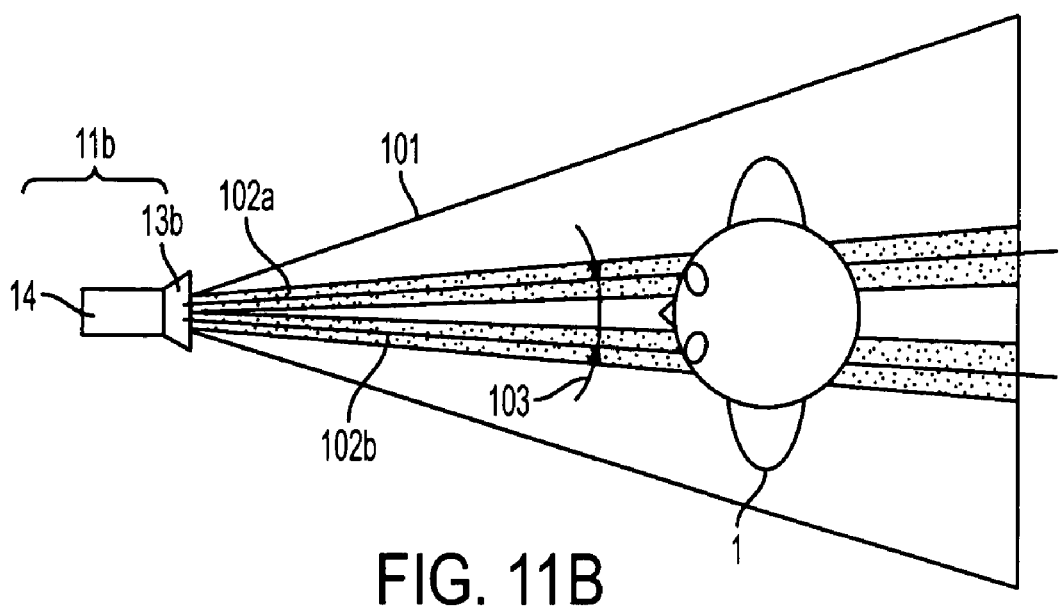

FIGS. 11A and 11B illustrate the range of the photograph of the multiple view angles camera 11b.

FIG. 11A illustrates the condition in which the subject 1 is far away from the camera. FIG. 11B illustrates the condition in which the subject 1 is close to the camera.

As shown in the figures, the multiple view angles camera 11b is controlled in such a way that the angle 103 between the right eye photograph range 102a and the left eye photograph range 102b becomes decreased when the subject 1 is far from the camera, and the angle 103 becomes increased when the subject 1 is close to the camera. Here, although the driving method of the prism 135 of the multiple view angles lens 13b is not shown in the drawing, it is supposed to use the conventional method.

Referring back to FIG. 10, the control unit 20a includes the image capture unit 21, the photograph direction control unit 22, and a photograph region angle control unit 25. Here, since the structure of the image capture unit 21 and the photograph direction control unit 22 is the same as the first and second embodiments, the same reference number is given to the corresponding part and thus the explanation therefor is omitted.

The photograph region angle control unit 25 has a function for controlling the angle 103 between the right eye photograph range 102a and the left eye photograph range 102b based on eye position information calculated by the photograph direction control unit 22. Namely, the photograph region angle control unit 25 has a function for changing the angle 103 by controlling a reflective angle of the prism 135 of the multiple view angles lens 13b.

Next, the iris recognition process using the automatic photographing apparatus of the present embodiment is explained.

Figure 12:
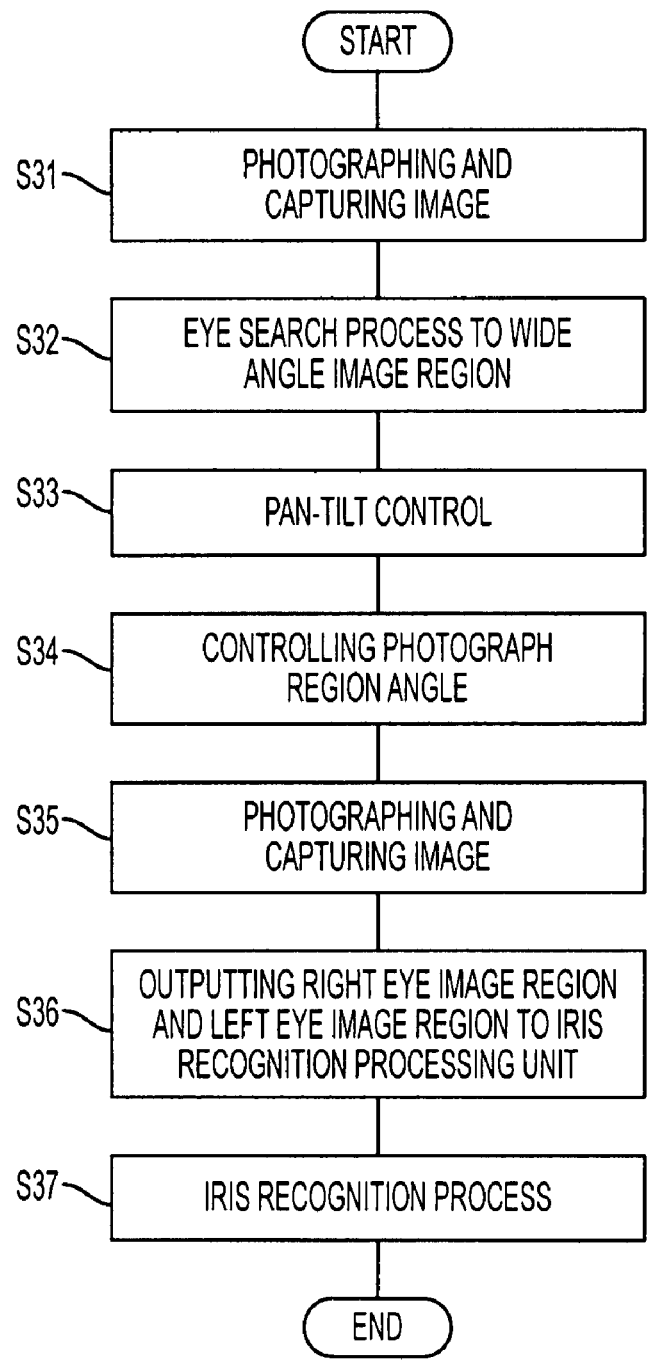
FIG. 12 is a flowchart of operating the third embodiment of the automatic photographing apparatus of the present invention.

FIG. 12 is a flowchart of the iris recognition process.

First of all, the subject 1 is photographed by the multiple view angles camera 11b, and the image thereof is captured by the image capture unit 21 (step S31).

Next, among the captured images, the eye search process is performed to the wide view angle image region 141a by the eye search processing unit 23 (step S32).

Based on the result of the eye search process, the pan-tilt mechanism 12 is controlled by the pan-tilt control unit 24, and the multiple view angles camera 11a is declined at a suitable angle. Here, the suitable angle means that the right eye photograph range 102a is capable of photographing the right eye of the subject 1 and the left eye photograph range 102b is capable of photographing the left eye of the subject 1 at the same time by the next step S34.

Further, the photograph region angle control unit 25, based on the result of the eye search process at the step S32, controls the multiple view angles lens 13b and changes the angle 103 between the right eye photograph range 102a and the left eye photograph range 102b until the right eye photograph range 102a is capable of photographing the right eye of the subject 1 and the left eye photograph range 102a is capable of photographing the left eye of the subject 1 (step S34).

Once more, the subject 1 is photographed by the multiple view angles camera 11b, and the image thereof is captured by the image capture unit 21 (step S35).

Among the captured images, the image of the right eye image region 141c and the left eye image region 141d is output to the iris recognition processing unit 30 (step S36).

In the iris recognition processing unit 30, the iris recognition process is performed and it is identified whether or not the subject is the person himself (step S37). If it is recognized that the subject is the person himself, a process for outputting the predetermined result, such as opening an electric key, is performed.

In this way, according to the third embodiment, since the multiple view angles camera 11b, which projects the wide view angle image and the narrow view angle image on one image sensor 141, is included, only one camera is required for its operation although two cameras have been required conventionally, and further it is made possible to lessen the size thereof and the cost therefor. Further, since the automatic photographing apparatus is structured using the multiple view angles camera 11b, it is enough to process only the image from one image sensor 141, and thus the process time can be reduced and further it is made possible to lessen the cost therefor because the processing circuit can be simplified. Further, since it is so structured as for a plurality of regions to be projected as the narrow view angle image and it is so structured as for the direction thereof to be changeable, it is possible to apply to the wider ranges by changing the distance between the camera unit 10b and the subject 1 and it is also possible in the iris recognition process to apply to the wider ranges even if the distances between the eyes are not the same as seen in the special case of children and adults.

Next, the fourth embodiment is explained herein.

The fourth embodiment is so structured as to control in order to read out from the image sensor 141 of the multiple view angles camera 11 of the first embodiment.

Figure 13:
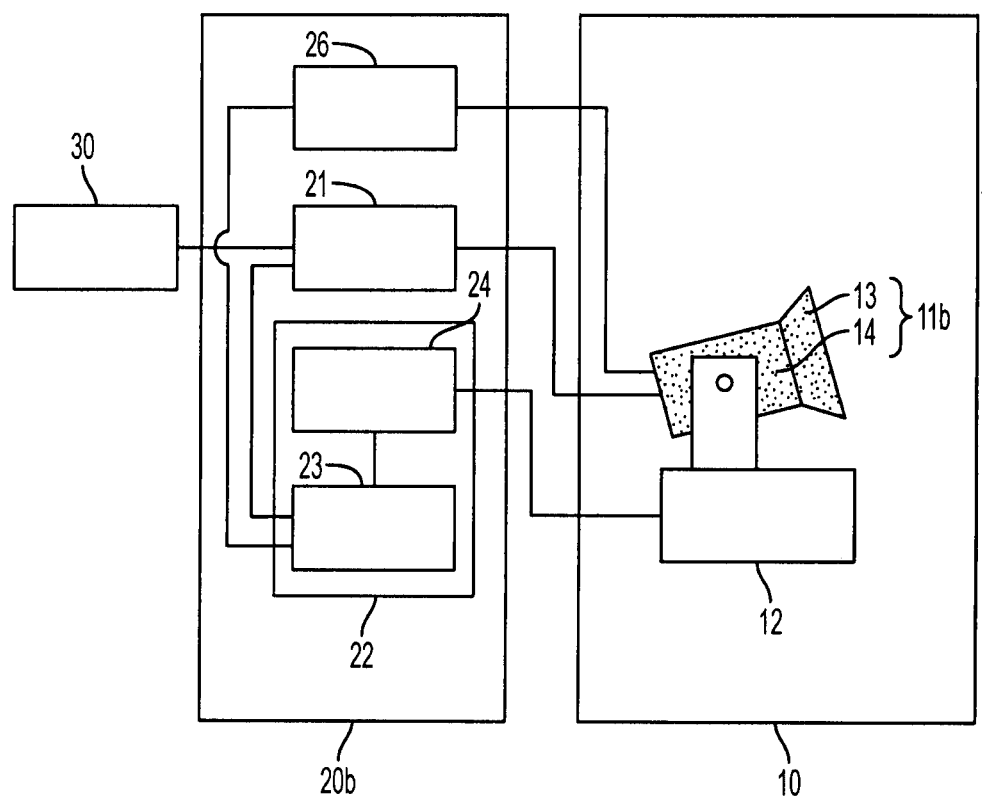
FIG. 13 is a block diagram of the fourth embodiment of the automatic photographing apparatus of the present invention.

FIG. 13 is a block diagram of the fourth embodiment of the automatic photographing apparatus of the present invention.

The system shown in the drawing indicates the system applied to the iris recognition process of performing the iris recognition using the automatic photographing apparatus.

The system of FIG. 13 includes the camera unit 10, the control unit 20b, and the iris recognition processing unit 30. Here, since the structure of the camera unit.

10 and the iris recognition processing unit 30 is the same as the camera unit 10 and the iris recognition processing unit 30 of the first embodiments, the explanation therefor is omitted.

The control unit 20b includes the image capture unit 21, the photograph direction control unit 22, and an image sensor read-out control unit 26. Here, since the image capture unit 21 and the photograph direction control unit 22 are the same as the above-mentioned embodiments, the explanation therefor is omitted.

The image sensor read-out control unit 26 is a control unit for reading out only a picture element line of a required region when the image is read out from the image sensor 141 of the camera 10. Namely this image sensor read-out control unit 26, when a process for determining the eye photograph range 102 from the image of the wide view angle image region 141a in the photograph direction control unit 22 is performed, reads out an image signal of the wide view angle image region 141a and gives it to the photograph direction control unit 22 and, when the multiple view angles camera 11 is controlled in order for the image of the eye photograph range 102 to be projected on the image sensor 141, controls it in order for the image signal of the eye image region 141b only to be read out.

Figure 14A:
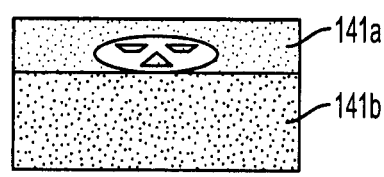
FIGS. 14A and 14B illustrate patterns read out from an image sensor of the fourth embodiment.
Figure 14B:
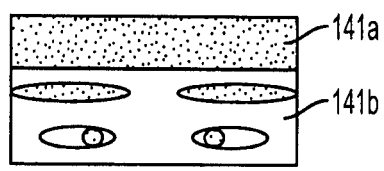

FIGS. 14A and 14B illustrate patterns readout from the image sensor of the fourth embodiment.

FIG. 14A illustrates a read-out image at the time of performing the eye search process. FIG. 14B illustrates a read-out image at the time of performing the iris recognition process. As indicated in such figures, the image sensor read-out control unit 26 controls in order to read out exclusively the image signal of the wide view angle image region 141a at the time of performing the eye search process based on the image of the wide view angle image region 141a and exclusively the image signal of the eye image region 141b at the time of performing the iris recognition process.

Next, the iris recognition process in which the automatic photographing apparatus of the present invention is used is explained herein.

Figure 15:
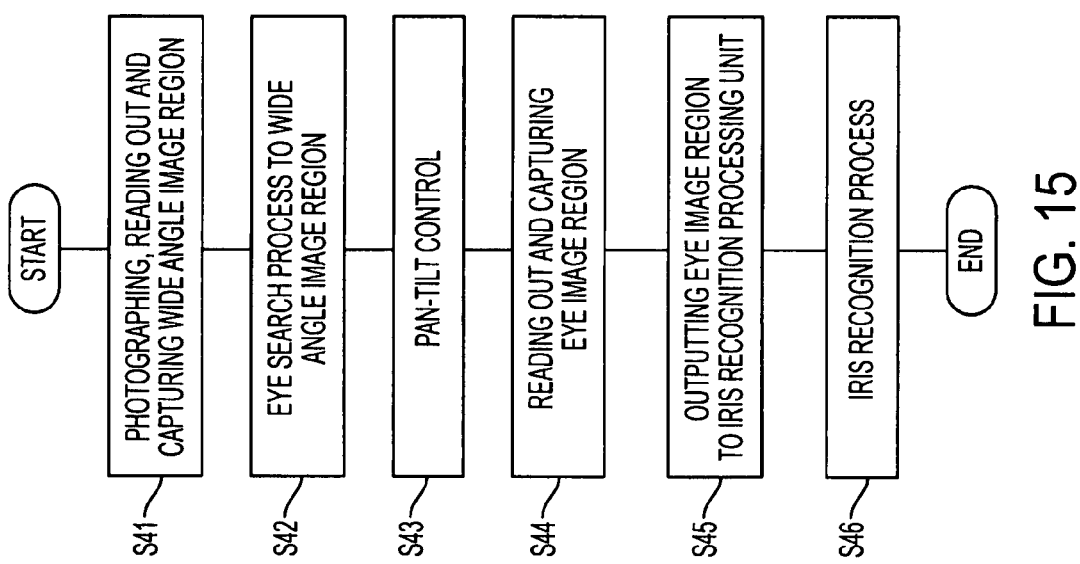
FIG. 15 is a flowchart of operating the fourth embodiment of the automatic photographing apparatus of the present invention.

FIG. 15 is a flowchart of the iris recognition process.

First of all, the subject 1 is photographed by the multiple view angles camera 11, and the image thereof is captured by the image capture unit 21 (step S41). At this time, the image signal of the wide view angle image region 141a is exclusively read out by controlling the image sensor read-out control unit 26, and then it is captured by the image capture unit 21.

Next, the eye search process is performed to the captured images of the wide view angle image region 141a by the eye search processing unit 23 (step S42).

Based on the result of the eye search process, the pan-tilt mechanism 12 is controlled by the pan-tilt control unit 24, and the multiple view angles camera 11 is declined at a suitable angle until both eyes of the subject 1 are capable of being photographed within the eye image region 141b (step S43).

Once more, the subject 1 is photographed by the multiple view angles camera 11, and the image thereof is captured by the image capture unit 21 (step S44). At this time, the eye image region 141b is exclusively read out by controlling the image sensor read-out control unit 26 and it is captured by the image capture unit 21.

Among captured images, the image of the right eye image region 141b is output to the iris recognition processing unit 30 (step S45).

In the iris recognition processing unit 30, the iris recognition process is performed and it is identified whether or not the subject is the person himself (step S46). If it is recognized that the subject is the person himself, a process for outputting the predetermined result, such as opening an electric key, is performed.

In this way, according to the fourth embodiment, since the multiple view angles camera 11, which projects the wide view angle image and the narrow view angle image on one image sensor 141, is included, only one camera is required for its operation although two cameras have conventionally been required, and further it is made possible to lessen the size thereof and the cost therefor.

Further, it is possible to reduce the time for reading out the image from the image sensor 141, since the automatic photographing apparatus is structured using the multiple view angles camera 11, the wide view angle image region 141a is exclusively read out from the image sensor 141 at the time of performing the eye search process, and the eye image region 141b is exclusively read out from the image sensor 141 after the eye search process and the pan-tilt control are terminated. For example, when the region of the wide view angle image region 141a is defined as ¼ to the whole image sensor and the region of the eye image region 141b is defined as ¾ to that, it is enough only to read out the wide view angle image region 141a at the time of performing the eye search process and thus it is possible to take ¼ time for the first embodiment to read out the image. Further, since it is enough only to read out the eye image region at the time of the iris recognition, it is possible to take ¾ time for the first embodiment to read out the image. Thus, if the iris recognition process is performed using such an automatic photographing apparatus, it is possible in effect to make time, during which the image including the whole face starts to photograph and the iris recognition process is terminated, shorter than the first embodiment.

Next, the fifth embodiment is explained herein.

The fifth embodiment is so structured as to control in order to read out the image sensor 141 of the multiple view angles camera 11a of the second embodiment.

Figure 16:
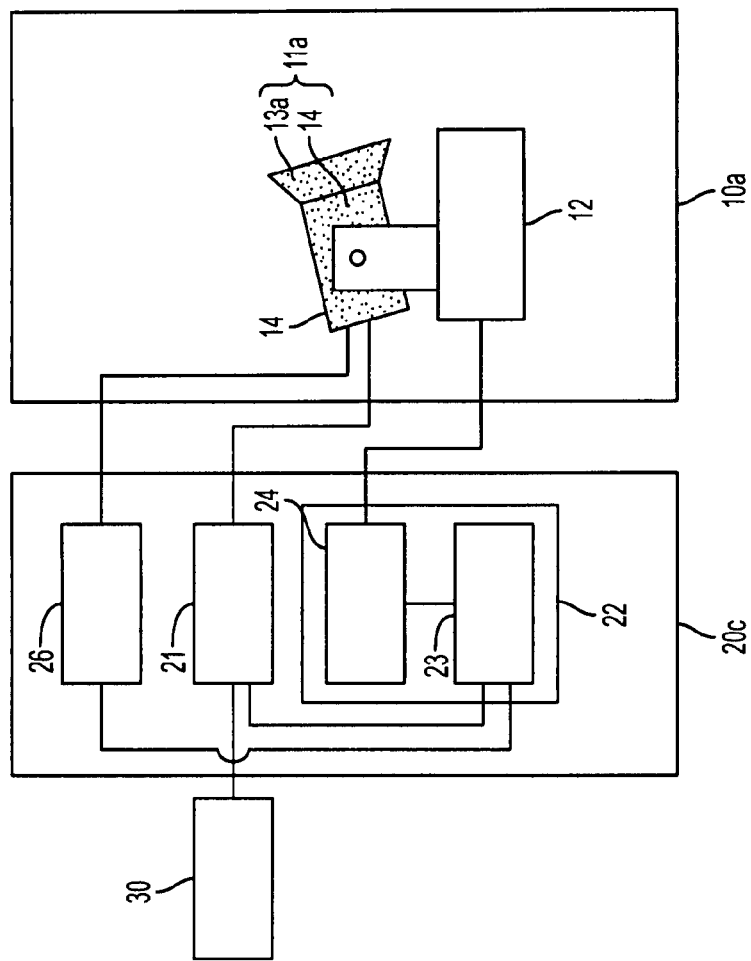
FIG. 16 is a block diagram of the fifth embodiment of the automatic photographing apparatus of the present invention.

FIG. 16 illustrates a block diagram of the fifth embodiment of the automatic photographing apparatus of the present invention.

The system illustrated therein is a block diagram when it is applied to the iris recognition process for performing iris recognition using the automatic photographing apparatus.

The system of the figure includes the camera unit 10a, a control unit 20c, and the iris recognition processing unit 30.

Since the structure of the camera unit 10a and the iris recognition processing unit 30 is the same as the structure of the camera unit 10a and the iris recognition processing unit 30 of the second embodiment, the explanation therefor is omitted herein.

The control unit 20c includes the image capture unit 21, the photograph direction control unit 22, and the image sensor read-out control unit 26. Here, the image capture unit 21 and the photograph direction control unit 22 are the same as those of the first to fourth embodiments, and the image sensor read-out control unit 26 is the same as that of the fourth embodiment. Namely, the image sensor read-out control unit 26 is a controller for controlling in order to exclusively read out a picture element line of a required region when the image is read out from the image sensor 141 of the camera unit 10a.

FIGS. 17A and 17B are patterns readout from the image sensor of the fifth embodiment.

FIG. 17A is the image read out at the time of performing the eye search process. FIG. 17B is the image read out at the time of performing the iris recognition process. As shown in these figures, the image sensor read-out control unit 26 controls so as to exclusively read out the image signal of the wide view angle image region 141a at the time of performing the eye search process based on the image of the wide view angle image region 141a and so as to exclusively read out the right eye image region 141c and the left eye image region 141d at the time of performing the iris recognition process.

Next, the iris recognition process using the eye search process of the present invention is explained herein.

FIG. 18 is a flowchart of the iris recognition process.

First of all, the subject 1 is photographed by the multiple view angles camera 11a, and the image thereof is captured by the image capture unit 21 (step S51). At this time, the image signal of the wide view angle image region 141a is exclusively read out by controlling the image sensor read-out control unit 26, and then it is captured by the image capture unit 21.

Next, the eye search process is performed for the captured images of the wide view angle image region 141a by the eye search processing unit 23 (step S52).

Based on the result of the eye search process, the pan-tilt mechanism 12 is controlled by the pan-tilt control unit 24, and the multiple view angles camera 11a is declined at a suitable angle until the right eye of the subject 1 is capable of being photographed within the right eye image region 141c and the left eye of the subject 1 is capable of being photographed within the left eye image region 141d (step S53).

Once more, the subject 1 is photographed by the multiple view angles camera 11a, and the image thereof is captured by the image capture unit 21 (step S54). At this time, the right eye image region 141c and the left eye image region 141d are exclusively read out by controlling the image sensor read-out control unit 26 and it is captured by the image capture unit 21.

The captured images of the right eye image region 141c and the left eye image region 141d are output to the iris recognition processing unit 30 (step S55).

In the iris recognition processing unit 30, the iris recognition process is performed and it is identified whether or not the subject is the person himself (step S56). If it is recognized that the subject is the person himself, a process for outputting the predetermined result, such as opening an electric key, is performed.

In this way, according to the fifth embodiment, since the multiple view angles camera 11a, which projects the wide view angle image and the narrow view angle image on one image sensor 141, is included, only one camera is required for its operation although two cameras have been conventionally required, and further it is made possible to lessen the size thereof and the cost therefor.

Further, it is possible to reduce the time for reading out the image from the image sensor 141 when the second embodiment is compared, since the automatic photographing apparatus is structured using the multiple view angles camera 11a, the wide view angle image region 141a is exclusively read out from the image sensor 141 at the time of performing the eye search process, and the right eye image region 141c and the left eye image region 141d are exclusively read out from the image sensor 141 after the eye search process and the pan-tilt control are terminated.

Further, since the iris recognition process is performed using such an automatic photographing apparatus, it is possible in effect to make time, during which the image including the whole face starts to photograph and the iris recognition process is terminated, shorter than the second embodiment.

Next, the sixth embodiment is explained herein.

The sixth embodiment is so structured as to control in order to read out the image sensor 141 of the multiple view angles camera 11b of the third embodiment.

Figure 19:
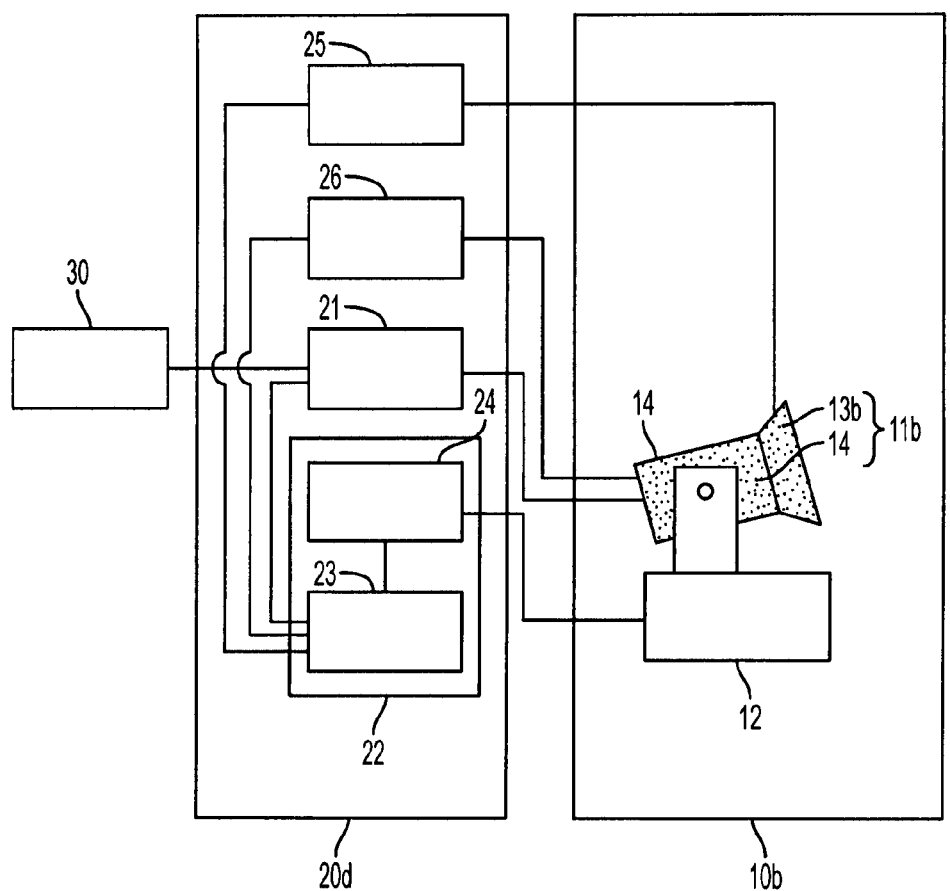
FIG. 19 is a block diagram of the sixth embodiment of the automatic photographing apparatus of the present invention.

FIG. 19 illustrates a block diagram of the sixth embodiment of the automatic photographing apparatus of the present invention.

The system illustrated therein is a block diagram when it is applied to the iris recognition process for performing iris recognition using the automatic photographing apparatus.

The system of the figure includes the camera unit 10b, a control unit 20d, and the iris recognition processing unit 30.

Since the structure of the camera unit 10b and the iris recognition processing unit 30 is the same as the structure of the camera unit 10b and the iris recognition processing unit 30 of the third embodiment, the explanation therefor is omitted herein.

The control unit 20d includes the image capture unit 21, the photograph direction control unit 22, the photograph region angle control unit 25, and the image sensor read-out control unit 26. Here, the image capture unit 21 and the photograph direction control unit 22 are the same as those of the first to fifth embodiments, and the photograph region angle control unit 25 is the same as the third embodiment. Further, the image sensor read-out control unit 26 is the same as that of the fourth and fifth embodiments. Namely, the image sensor read-out control unit 26 is a controller for controlling in order to exclusively read out a picture element line of a required region when the image is read out from the image sensor 141 of the camera unit 10b.

Figure 20A:
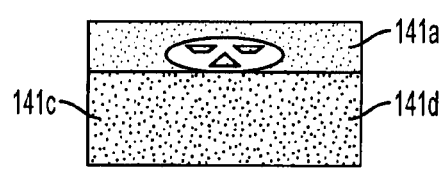
FIGS. 20A and 20B illustrate patterns read out from an image sensor of the sixth embodiment.
Figure 20B:
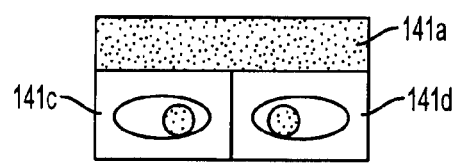

FIGS. 20A and 20B illustrate patterns readout from the image sensor of the fifth embodiment.

FIG. 20A illustrates a read-out image at the time of performing the eye search process. FIG. 20B illustrates a read-out image at the time of performing the iris recognition process. As indicated in such figures, the image sensor read-out control unit 26 controls in order to exclusively read out the image signal of the wide view angle image region 141a at the time of performing the eye search process based on the image of the wide view angle image region 141a and exclusively the right eye image region 141c and the left eye image region 141d at the time of performing the iris recognition process.

Next, the iris recognition process in which the automatic photographing apparatus of the present invention is used is explained herein.

Figure 21:
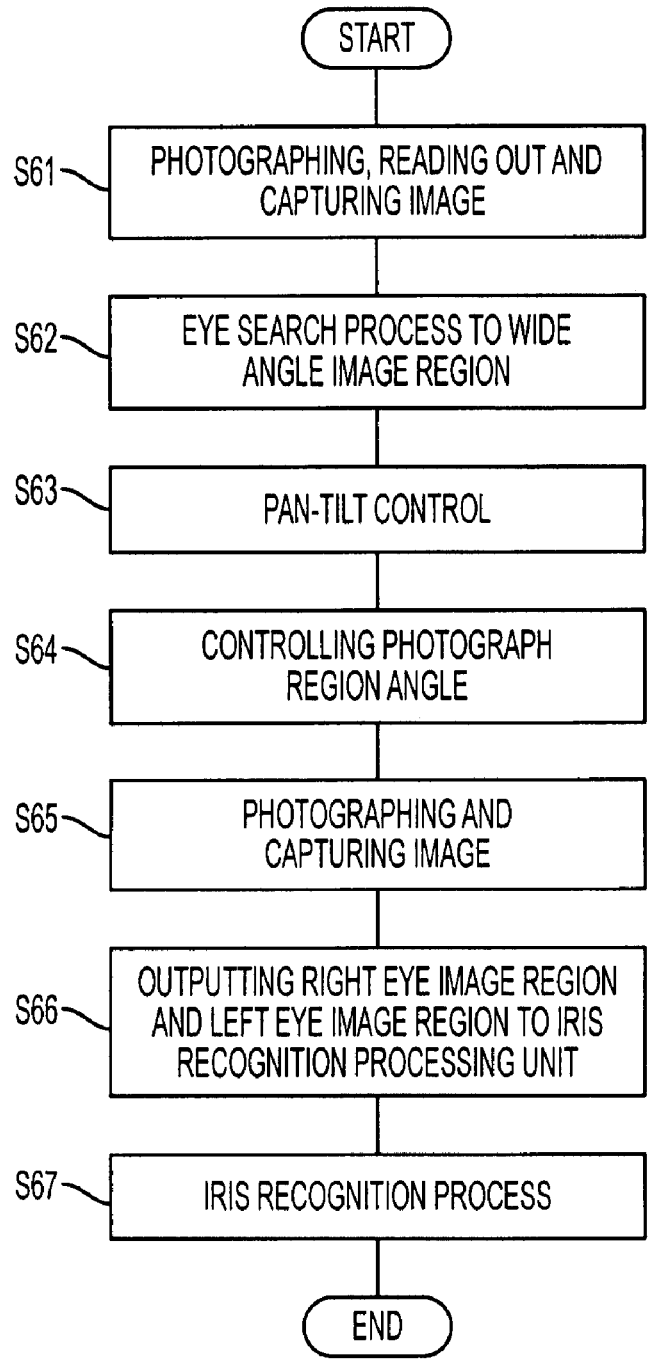
FIG. 21 is a flowchart of operating the sixth embodiment of the automatic photographing apparatus of the present invention.

FIG. 21 is a flowchart of the iris recognition process.

First of all, the subject 1 is photographed by the multiple view angles camera 11b, and the image thereof is captured by the image capture unit 21 (step S61). At this time, the wide view angle image region 141a is exclusively read out by controlling the image sensor read-out control unit 26, and then it is captured by the image capture unit 21.

Next, the eye search process is performed to the captured images of the wide view angle image region 141a by the eye search processing unit 23 (step S62).

Based on the result of the eye search process, the pan-tilt mechanism 12 is controlled by the pan-tilt control unit 24, and the multiple view angles camera 11 is declined at a suitable angle (step S63). Here, the suitable angle indicates an angle for making it possible that the right eye image region 141c is capable of photographing the right eye of the subject 1 and the left eye image region 141d is capable of photographing the left eye of the subject 1.

Further, based on the result of the eye search process, the angle 103 between the right eye photograph range 102a and the left eye photograph range 102b is changed by controlling the multiple view angles camera 11b by way of the photograph region angle control unit 25 until the right eye photograph range 102a is capable of photographing the right eye of the subject 1 and the left eye photograph range 102b is capable of photographing the left eye of the subject 1 (step S64).

Once more, the subject 1 is photographed by the multiple view angles camera 11b, and the image thereof is captured by the image capture unit 21 (step S65). At this time, the right eye image region 141c and the left eye image region 141d are exclusively read out by controlling the image sensor read-out control unit 26 and it is captured by the image capture unit 21.

Among the captured images, the image of the right eye image region 141c and the left eye image region 141d are output to the iris recognition processing unit 30 (step S66).

The captured images of the right eye image region 141c and the left eye image region 141d are output to the iris recognition processing unit 30 (step S66).

In the iris recognition processing unit 30, the iris recognition process is performed and it is identified whether or not the subject is the person himself (step S67). If it is recognized that the subject is the person himself, a process for outputting the predetermined result, such as opening an electric key, is performed.

In this way, according to the sixth embodiment, since the multiple view angles camera, which projects the wide view angle image and the narrow view angle image on one image sensor 141, is included, only one camera is required for its operation although two cameras have conventionally been required, and further it is made possible to lessen the size thereof and the cost therefor.

Further, in the structure of the automatic photographing apparatus of the third embodiment, it is possible to reduce the time for reading out the image from the image sensor 141 when the third embodiment is compared, since the wide view angle image region 141a is exclusively read out from the image sensor 141 at the time of performing the eye search process and the right eye image region 141c and the left eye image region 141d are exclusively read out from the image sensor 141 after the eye search process and the pan-tilt control are terminated.

Further, the iris recognition process is performed using such an automatic photographing apparatus, it is possible in effect to make time, during which the image including the whole face starts to photograph and the iris recognition process is terminated, shorter than the first embodiment.

Although the case of applying the iris recognition process as application examples is explained in the above-mentioned respective embodiments, the subject is not limited thereto, but it is applicable to the automatic photographing apparatus for automatically detecting a specific portion from the image photographed in a wide view angle manner, for moving the camera byway of the pan-tilt mechanism, and for photographing the portion thereof in a narrow view angle manner, such as an apparatus for obtaining the image of a number plate from the image of the whole car, for example.

Further, although the case of two photograph ranges as plural narrow photograph ranges is explained in the second, third, fifth, and sixth embodiments, the photograph range is not limited thereto, but more than three photograph ranges are capable of being applicable.

As clearly described in the foregoing, according to the present invention, it is not a result for the photograph size of the iris of an eye image region to be reduced. Only one camera is required for its operation although two cameras have conventionally been required, and further it is made possible to lessen the size thereof and the cost therefor. It is enough to process only the image from one image sensor, and thus the process time can be reduced. A process circuit can be simplified and it is possible to reduce the cost thereof. It is possible to increase the speed of the iris recognition process without damaging the precision of the iris recognition. It is possible to project the required region, such as right and left eye images, by magnifying them. Still further, it is possible to increase the speed of the iris recognition process without damaging the precision of the iris recognition, and further it is possible to improve the precision of the iris recognition process. By using such a multiple view angles lens, a left eye image and a right eye image as the images of right and left narrow view angle photograph ranges are projected on the upper region of the image sensor, and the face image as the image of the wide photograph range is projected on the lower region of the image sensor. It is possible to apply to the wider ranges by changing the distance between the camera unit and the subject and it is also possible in the iris recognition process to apply to the wider ranges even if the distances between the eyes are not the same as seen in the special case of children and adults. If the iris recognition process is performed using such an automatic photographing apparatus, it is possible in effect to make time, during which the image including the whole face starts to photograph and the iris recognition process is terminated, shorter than the first embodiment.

Although the present invention has been described by way of exemplary embodiments, it should be understood that many changes and substitutions may be made by those skilled in the art without departing from the spirit and the scope of the present invention which is defined only by the appended claims.

What is claimed is:

1. An automatic photographing apparatus, comprising:
 a multiple view angles camera for projecting an image of a wide view angle photograph range and images of more than one narrow view angle photograph ranges on a wide view angle image region and more than one narrow view angle image regions of one image sensor at the same time, and for outputting the images as an image signal;
 a pan-tilt mechanism for changing a photographing direction of said multiple view angles camera; and
 a photograph direction control means for defining the photographing direction to photograph more than one specific portions of a specific subject with the more than one narrow view angle photograph ranges based on the image of the specific subject in the wide view angle photograph range of said multiple view angles camera, and for controlling said pan-tilt mechanism based on the photographing direction.

2. An automatic photographing apparatus according to claim 1, comprising:
an image sensor reading-out control means for, when said photograph direction control means performs a process for defining a photographing direction of said multiple view angles camera to photograph more than one specific portions of the subject with more than one narrow view angle photograph ranges, reading out the image signal of the wide view angle image region from the image sensor and giving it to said photograph direction control means, and when the specific portion's images are used by later process after said photograph direction control means controlled the photographing direction, reading out the image signal of the set of the narrow view angle image regions from the image sensor.

3. An automatic photographing apparatus, comprising:
a multiple view angles camera, for projecting an image of a wide view angle photograph range and images of more than one narrow view angle photograph ranges on a wide view angle image region and more than one narrow view angle image regions on one image sensor at the same time, which is structured with each directions of more than one narrow view angle photograph ranges to be changeable;
a pan-tilt mechanism for changing a photographing direction of said multiple view angles camera;
a photograph direction control means for defining a photographing direction to photograph more than one specific portion of a specific subject with more than one narrow view angle photograph ranges based on the image of the specific subject in the wide view angle photograph range of said multiple view angles camera, and for controlling said pan-tilt mechanism based on the photographing direction; and
a photograph region angle control means for controlling respective directions of more than one narrow view angle photograph range of said multiple view angles camera based on a relationship between positions of more than one specific portions of the specific subject.

4. An automatic photographing apparatus according to claim 3, comprising:
an image sensor reading-out control means for, when said photograph direction control means performs a process for defining a photographing direction of said multiple view angles camera to photograph more than one specific portions of the subject with more than one narrow view angle photograph range, reading out the image signal of the wide view angle image region from the image sensor and giving it to said photograph direction control means, and when the specific portion's images are used by later process after said photograph direction control means controlled the photographing direction, reading out the image signal of the set of the narrow view angle image regions from the image sensor.

5. An automatic photographing apparatus comprising:
a multiple view angles camera for projecting an image of a wide view angle photograph range and an image of a narrow view angle photograph range on a wide view angle image region and a narrow view angle image region of one image sensor at the same time, and for outputting the images as an image signal;
a pan-tilt mechanism for changing a photographing direction of said multiple view angles camera;
a photograph direction control means for defining the photographing direction to photograph a specific portion of a specific subject with the narrow view angle photograph range based on the image of the specific subject in the wide view angle photograph range of said multiple view angles camera, and for controlling said pan-tilt mechanism based on the photographing direction; and
an image sensor read-out control means for, when said photograph direction control means performs a process for defining a photographing direction of said multiple view angles camera to photograph a specific portion of a subject with a narrow view angle photograph range, reading out an image signal of a wide view angle image region from the image sensor and giving it to said photograph direction control means, and when the specific portion's image is used by later process after said photograph direction control means controlled the photographing direction, reading out an image signal of a narrow view angle image region from the image sensor.

* * * * *